United States Patent
Channabasappa

(10) Patent No.: US 8,990,631 B1
(45) Date of Patent: Mar. 24, 2015

(54) PACKET FORMAT FOR ERROR REPORTING IN A CONTENT ADDRESSABLE MEMORY

(75) Inventor: Shankar Channabasappa, San Jose, CA (US)

(73) Assignee: Netlogic Microsystems, Inc., Irvine, CA (US)

( * ) Notice: Subject to any disclaimer, the term of this patent is extended or adjusted under 35 U.S.C. 154(b) by 645 days.

(21) Appl. No.: 13/039,616

(22) Filed: Mar. 3, 2011

(51) Int. Cl.
*G06F 11/07* (2006.01)
*H04L 12/26* (2006.01)

(52) U.S. Cl.
CPC ................................ *H04L 12/2647* (2013.01)
USPC .............................. 714/42; 714/6.1; 714/6.11

(58) Field of Classification Search
CPC  G06F 11/0766; G06F 11/072; G06F 11/0727
USPC ........................................................... 714/42
See application file for complete search history.

(56) References Cited

U.S. PATENT DOCUMENTS

| | | | |
|---|---|---|---|
| 4,112,502 A | 9/1978 | Scheuneman | |
| 4,747,080 A | 5/1988 | Yamada | |
| 4,882,731 A | 11/1989 | van Gils | |
| 5,086,429 A | 2/1992 | Gray et al. | |
| 5,107,501 A | 4/1992 | Zorian | |
| 5,283,876 A * | 2/1994 | Tague | 711/207 |
| 5,392,301 A | 2/1995 | Fukushima | |
| 5,450,424 A | 9/1995 | Okugaki et al. | |
| 5,453,999 A | 9/1995 | Michaelson et al. | |
| 5,455,834 A | 10/1995 | Chang et al. | |
| 5,491,703 A | 2/1996 | Barnaby et al. | |
| 5,651,133 A | 7/1997 | Burkes et al. | |
| 5,699,288 A | 12/1997 | Kim et al. | |
| 5,796,758 A | 8/1998 | Levitan | |
| 5,872,802 A | 2/1999 | Knaack et al. | |
| 5,914,907 A | 6/1999 | Kobayashi et al. | |
| 5,978,947 A | 11/1999 | Kim et al. | |
| 5,999,450 A | 12/1999 | Dallabora et al. | |
| 6,012,131 A | 1/2000 | Kang | |
| 6,014,755 A | 1/2000 | Wells et al. | |
| 6,067,262 A | 5/2000 | Irrinki et al. | |
| 6,067,656 A | 5/2000 | Rusu et al. | |
| 6,085,334 A | 7/2000 | Giles et al. | |
| 6,137,707 A | 10/2000 | Srinivasan et al. | |
| 6,154,384 A | 11/2000 | Nataraj et al. | |
| 6,199,140 B1 | 3/2001 | Srinivasan et al. | |
| 6,243,281 B1 | 6/2001 | Pereira | |
| 6,268,807 B1 | 7/2001 | Miller et al. | |
| 6,275,406 B1 | 8/2001 | Gibson et al. | |
| 6,310,880 B1 | 10/2001 | Waller | |
| 6,324,087 B1 | 11/2001 | Pereira | |
| 6,339,539 B1 | 1/2002 | Gibson et al. | |

(Continued)

*Primary Examiner* — Chae Ko
(74) *Attorney, Agent, or Firm* — Sterne, Kessler, Goldstein & Fox PLLC

(57) ABSTRACT

Approaches for a packet format for error reporting in a content addressable memory (CAM) device are disclosed. The CAM device may comprise a CAM array that includes a plurality of rows, each row including a plurality of CAM cells coupled to a match line, and an error notification circuit capable of forming a packet that indicates whether the CAM device is experiencing an error condition. If an error condition was experienced by the CAM device, the response packet may also indicate the type(s) of error that was encountered. Advantageously, information about any error condition experienced by the CAM device may be quickly ascertained by a host device in which the CAM device is incorporated.

15 Claims, 18 Drawing Sheets

(56) References Cited

U.S. PATENT DOCUMENTS

| | | | |
|---|---|---|---|
| 6,366,978 B1 | 4/2002 | Middleton et al. | |
| 6,381,673 B1 | 4/2002 | Srinivasan et al. | |
| 6,385,071 B1 | 5/2002 | Chai et al. | |
| 6,420,990 B1 | 7/2002 | Voelkel | |
| 6,421,265 B1 | 7/2002 | Lien et al. | |
| 6,430,073 B1 | 8/2002 | Batson et al. | |
| 6,430,074 B1 | 8/2002 | Srinivasan | |
| 6,445,628 B1 | 9/2002 | Pereira et al. | |
| 6,512,684 B2 | 1/2003 | Gordon et al. | |
| 6,542,391 B2 | 4/2003 | Pereira et al. | |
| 6,560,156 B2 | 5/2003 | Lien et al. | |
| 6,564,344 B1 | 5/2003 | Bui et al. | |
| 6,570,877 B1 | 5/2003 | Kloth et al. | |
| 6,597,594 B2 | 7/2003 | Waller | |
| 6,597,595 B1 | 7/2003 | Ichiriu | |
| 6,609,222 B1 * | 8/2003 | Gupta et al. | 714/733 |
| 6,625,766 B1 | 9/2003 | Oh et al. | |
| 6,657,878 B2 | 12/2003 | Lien et al. | |
| 6,681,359 B1 | 1/2004 | Au et al. | |
| 6,690,595 B1 | 2/2004 | Srinivasan et al. | |
| 6,691,252 B2 | 2/2004 | Hughes et al. | |
| 6,697,276 B1 | 2/2004 | Pereira et al. | |
| 6,697,911 B2 | 2/2004 | Srinivasan | |
| 6,700,810 B1 | 3/2004 | Ichiriu et al. | 365/49 |
| 6,700,827 B2 | 3/2004 | Lien et al. | |
| 6,707,693 B1 | 3/2004 | Ichiriu | |
| 6,718,494 B1 | 4/2004 | Jamil et al. | |
| 6,728,124 B1 | 4/2004 | Ichiriu et al. | |
| 6,760,881 B2 | 7/2004 | Batson et al. | |
| 6,914,795 B1 | 7/2005 | Srinivasan et al. | 365/49 |
| 6,978,343 B1 | 12/2005 | Ichiriu | |
| 6,987,682 B2 | 1/2006 | Ma et al. | |
| 7,002,823 B1 | 2/2006 | Ichiriu | 365/49 |
| 7,043,673 B1 | 5/2006 | Ichiriu et al. | 714/719 |
| 7,237,156 B1 | 6/2007 | Srinivasan et al. | |
| 7,254,748 B1 | 8/2007 | Wright et al. | |
| 7,257,763 B1 | 8/2007 | Srinivasan et al. | 714/764 |
| 7,283,380 B1 | 10/2007 | Srinivasan et al. | 365/49 |
| 7,304,873 B1 | 12/2007 | Gupta | 365/49 |
| 2002/0083421 A1 | 6/2002 | Simons | |
| 2003/0007408 A1 * | 1/2003 | Lien et al. | 365/222 |
| 2005/0076273 A1 * | 4/2005 | Mantri | 714/718 |
| 2006/0106577 A1 * | 5/2006 | Hatakeyama | 702/183 |
| 2007/0168777 A1 * | 7/2007 | Regev et al. | 714/718 |
| 2007/0174733 A1 * | 7/2007 | Boyd et al. | 714/48 |
| 2008/0043507 A1 * | 2/2008 | Srinivasan et al. | 365/49.1 |
| 2009/0044086 A1 * | 2/2009 | Craske et al. | 714/799 |
| 2009/0063914 A1 * | 3/2009 | Owsley et al. | 714/718 |
| 2009/0092054 A1 * | 4/2009 | Compton et al. | 370/242 |
| 2009/0250820 A1 * | 10/2009 | Argyres et al. | 257/758 |
| 2011/0072298 A1 * | 3/2011 | Kuroda | 714/2 |

* cited by examiner

| Control Word | | |
|---|---|---|
| Bits: | 65:64 | 63:0 |
| Content: | Framing | Control Word |
| Data Word 0 | | |
| Bits: | 65:64 | 63:0 |
| Content: | Framing | Valid Data - 8 bytes |
| Data Word 1 | | |
| Bits: | 65:64 | 63:0 |
| Content: | Framing | Valid Data - 8 bytes |
| Data Word 2 | | | |
| Bits: | 65:64 | 63:31 | 31:0 |
| Content: | Framing | Valid Data - 4 bytes | 32'b0 |

FIG. 4

| Bits | Field Name | Description |
|---|---|---|
| 66 | Inversion | Interlaken Look-Aside specified field<br><br>Used to indicate whether bits [63:0] have been inverted to limit the running disparity<br><br>1'b1 = inverted<br>1'b0 = not inverted |
| 65:64 | Framing | Interlaken Look-Aside specified field<br><br>64b/67b mechanism to distinguish control and data words<br><br>Must be written with 2'b10 for control words |
| 63 | Control | Interlaken Look-Aside specified field<br><br>1'b1 - this is an Idle or Burst Control Word<br>1'b0 - this is a Framing Layer Control Word |
| 62 | Type | Interlaken Look-Aside specified field<br><br>1'b1 - the channel number and SOP fields are valid and a data burst follows this control word (a 'Burst Control Word')<br>1'b0 - the channel number field and SOP fields are invalid and no data follows this control word (an 'Idle Control Word') |
| 61 | SOP | Interlaken Look-Aside specified field<br><br>Start of Packet<br><br>1'b1 - the data burst following this control word represents the start of a data packet |

FIG. 5A

| Bits | Field Name | Description |
|---|---|---|
| 60:57 | EOP[3:0] | Interlaken Look-Aside specified field<br><br>This field refers to the data burst preceding this control word<br><br>4'b1xxx - End-of-Packet, with bits [59:57] defining the number of valid bytes in the last 8-byte word in the burst. Bits [59:57] are encoded such that 3'b000 means 8 bytes valid, 3'b001 means 1 byte valid, etc., with 3'b111 meaning 7 bytes valid. The valid bytes start with bit position [63:56]<br>4'b0000 - no End-of-Packet, no ERR<br>4'b0001 - Error and End-of-Packet<br><br>For IDLE control words that follow data burst, this field is valid and its definition is as described. For non-packet-ending IDLE control words, EOP[3] is invalid and may be random.<br><br>All other combinations are undefined |
| 56 | Reserved | Reserved |
| 55:42 | ContextAddr[13:0] | Context Buffer Address - The address within the Context Buffer |
| 41 | Reserved | Reserved, must be written with 0 |
| 40 | Flow Control | Interlaken Look-Aside specified field<br><br>Flow Control - Flow control indication<br><br>Flow Control[0] = 1'b1 = Flow control ON<br>Flow Control[0] = 1'b0 = Flow control OFF |
| 39 | Interlaken Look-Aside / Protocol Type | Interlaken Look-Aside specified field<br><br>Must be written with 1'b1 to indicate Interlaken Look-Aside protocol<br><br>If this bit is 1'b0, this packet is ignored |
| 38:33 | Opcode[5:0] | Opcode[5:0]<br><br><br><br>For response packets, Opcode[5:0] contents are copied from the corresponding request packets' Opcode [5:0] |
| 32 | Channel Number | Interlaken Look-Aside specified field<br><br>Reserved, must be written with 0 |
| 31:30 | Error Status | Error Status |

FIG. 5B

| Bits | Field Name | Description |
|---|---|---|
| 29:27 | Reserved | Reserved, must be written with 0 |
| 26:24 | Opcode[8:6] | Opcode[8:6]<br><br>For response packets, Opcode[8:6] contents are copied from the corresponding request packets' Opcode [8:6] |
| 23:0 | CRC24 | Interlaken Look-Aside specified field<br><br>A CRC error check that covers the previous data burst, if any, and this control word |

FIG. 5C

| Bits | Field Name | Description |
|---|---|---|
| 66 | Inversion | Interlaken Look-Aside specified field<br><br>Used to indicate whether bits [63:0] have been inverted to limit the running disparity<br><br>1 = inverted<br>0 = not inverted |
| 65:64 | Control/Data | Interlaken Look-Aside specified field<br><br>64b/67b mechanism to distinguish control and data words<br><br>Must be written with 2'b01 for data words |
| 63:0 | Data/Reserved | Valid data associated with each instruction |

FIG. 6

Error Status Field Found in Response Control Word bits [31:30]

| Status[1:0] | Type of Error | Description | Action Taken by Device |
|---|---|---|---|
| Status[0] | Packet Error | Packet Error - When set an error has been detected in the request packet or instruction processing<br><br>1'b0 = No Packet Error<br>1'b1 = Packet Error | Response packet replaced with error response packet, original request discarded<br><br>GIO_L[0] is asserted |
| Status[1] | Interface Error | Interface Error - When set an error has been detected in either the framing or link layer of the Interlaken Look-Aside protocol or the request / response FIFO Overflow has occurred<br><br>1'b0 = No Interface Error<br>1'b1 = Interface Error | Original request packet was processed and response packet contains valid results as under normal conditions<br><br>Xoff asserted in response packet<br><br>GIO_L[1] is asserted |
| | Device Error | Device Error - When set an error has been detected in the device; Database Soft Error<br><br>1'b0 = No Device Error<br>1'b1 = Device Error | Original request packet was processed and response packet contains valid results as under normal conditions<br><br>GIO_L[1] is asserted |

FIG. 7

Packet Error Response Format

| Control Word | | | | | | | | | | |
|---|---|---|---|---|---|---|---|---|---|---|
| 66:57 | 56 | 55:42 | 41 | 40:39 | 38:33 | 32 | 31:30 | 29:27 | 26:24 | 23:0 |
| I-LA Field | Rsvd | Context Addr[13:0] | Rsvd | I-LA Field | Opcode[5:0] = Incoming Opcode | I-LA Field | Error Status = 2'b01 | Rsvd | Opcode[8:6] = Incoming Opcode | CRC24 |
| Data Word 0 | | | | | | | | | | |
| 66:64 | 63:0 | | | | | | | | | |
| I-LA Field | Packet Error Code | | | | | | | | | |
| Data Word 1 | | | | | | | | | | |
| 66:64 | 63:0 | | | | | | | | | |
| I-LA Field | 64'b0 | | | | | | | | | |

FIG. 8

| Bits | Field Name | Description |
|---|---|---|
| 63:42 | Reserved | Reserved |
| 41 | Power Limiting Error | 1'b0 - no Power Limiting Error detected<br>1'b1 - Exceeded the maximum number of active blocks per search |
| 40 | Reserved | Reserved |
| 39 | Context Buffer Parity Error | 1'b0 - no Context Buffer Parity Error detected<br>1'b1 - Context Buffer Parity Error detected |
| 38 | LTR Parity Error | 1'b0 - no LTR Parity Error detected<br>1'b1 - LTR Parity Error detected |
| 37 | Device ID Mismatch | 1'b0 - no Device ID Mismatch Error detected<br>1'b1 - Device ID Mismatch Error detected |
| 36 | Illegal Instruction Error | 1'b0 - no Illegal Instruction Error detected<br>1'b1 - Illegal Instruction Error detected |
| 35:17 | Reserved | Reserved |
| 16 | RxPCS EFIFO Parity Error | 1'b0 - no Parity error detected in RxPCS EFIFO<br>1'b1 - Parity error detected in RxPCS EFIFO |
| 15 | Burst Control Word Error | 1'b0 - no Burst Control Word Error detected<br>1'b1 - Interlaken Data Word received without Burst Control Word |

FIG. 9A

| Bits | Field Name | Description |
|---|---|---|
| 14 | Channel Number Error | 1'b0 - no Channel Number Error detected<br>1'b1 - Received instruction on channel #1 |
| 13 | Protocol Error | 1'b0 - no Protocol Error detected<br>1'b1 - Received Interlaken packet instead of Interlaken look-aside packet |
| 12 | Instruction Burst Error | 1'b0 - no Instruction Burst Error detected<br>1'b1 - Mismatch in the number of expected data words for PIO and NOP instructions |
| 11 | RxNMAC FIFO Parity Error | 1'b0 - no parity error detected in RxNMAC FIFO<br>1'b1 - Parity error detected in RxNMAC FIFO |
| 10 | Framing Control Word Error | 1'b0 - no Framing Control Word Error<br>1'b1 - Unexpectedly received framing control word |
| 9 | Alignment Error | 1'b0 - Legal framing bit combinations received (2'b10 or 2'b01 are legal combinations)<br>1'b1 - Illegal framing bit combination received (2'b00 or 2'b11 are illegal combinations) |
| 8 | Burst Max Error | 1'b0 - no Burst Max Error detected<br>1'b1 - Received more than 10 data words in a burst |
| 7 | Missing Data Packet Error | 1'b0 - no Missing Data Packet Error detected<br>1'b1 - Did not receive any Data Words immediately following a Burst Control Word |
| 6 | EOP Error | 1'b0 - no EOP Error detected<br>1'b1 - EOP missing in the Burst Control Word that follows Data Words |
| 5 | SOP Error | 1'b0 - no SOP Error detected<br>1'b1 - SOP missing in the Burst Control Word that precedes Data Words |
| 4 | CRC24 Error | 1'b0 - no CRC24 Error detected<br>1'b1 - CRC24 Error detected |
| 3:0 | Device Reporting Error | Device which generated error<br>[3] Device #3<br>[2] Device #2<br>[1] Device #1<br>[0] Device #0 |

FIG. 9B

| Error Name | Error Description | | Action taken by the device | Management Counters and Status Registers |
| --- | --- | --- | --- | --- |
| | Cause of Error | Functions Affected | | |
| Interface Errors | | | | |
| CRC32 Error | Diagnostic per-lane bit error across metaframe | Transmission of response packets are not affected. | The device will log the CRC32 error count in management counters accessible to the host through the MDIO interface. GIO_L[1] is asserted to indicate interface error. Error status bit [1] in the response control words at a given snapshot are updated to reflect the interface error. | RX_pcs_#_crc_err[31:0] |
| Synchronization bits Error | Occurs when data word or control word bits 65:64 equal 00 or 11. These are invalid synchronization patterns. | If the error occurs during data/control words window, then response is sent with packet error error code for "alignment error" and GIO_L[0] is also asserted. | GIO_L[1] is asserted indicating input interface error. If the error occurs during data/control words window, then response is sent with packet error error code for "alignment error" and GIO_L[0] is also asserted. Error status bits in the response control words at a given snapshot are updated to reflect the interface error. | Rx PCS Word Alignment Status [7:4] RX_pcs_#_word_sync_err[31:0] |
| Word Boundary Synchronization Error | 16 Illegal synchronization patterns (00 or 11 on bits 65:64 of data or control word) are received in a 64 word window. | Traffic on all receive lanes will be dropped. For each open packet received, a response packet is sent out with word alignment error (interface error). Once the 16th illegal synchronization pattern within 64 words is received, Xoff is sent from the device to host. | All lanes will go into word alignment mode and scrambler state synchronization before accepting valid data again. The device sends an Xoff to the host. GIO_L[1] is asserted to indicate interface error. Error status bits in the response control words at a given snapshot are updated to reflect the interface error. | RX_pcs_#_align_failed[31:0] |

FIG. 10A

| Error Name | Error Description | | Action taken by the device | Management Counters and Status Registers |
|---|---|---|---|---|
| | Cause of Error | Functions Affected | | |
| Packet Errors | | | | |
| Power limiting error | If the number of blocks simultaneously accessed during a search operation exceeds the device limit. | The search is not carried out. An error packet will be sent out. | GIO_L[0] pin will be asserted. Error status bit [0] will also be asserted. Error is reported in the error status register. | Error is reported in the error status register. |
| Context Buffer Parity Error | If a parity error is detected in the context buffer memory during a compare operation. | The search is not carried out. An error packet will be sent out. | GIO_L[0] pin will be asserted. Error status bit [0] will also be asserted. Error is reported in the error status register. | Error is reported in the error status register. |
| LTR Parity Error | If a parity error is detected in the LTR register during a compare operation. | The search is not carried out. An error packet will be sent out. | GIO_L[0] pin will be asserted. Error status bit [0] will also be asserted. Error is reported in the error status register. | Error is reported in the error status register. |
| Device ID Mismatch | If a device ID larger than the device ID of the last device is addressed this error is reported. | The device write/read operation does not go through. | GIO_L[0] pin will be asserted. Error status bit [0] will also be asserted. Error is reported in the error status register. | Error is reported in the error status register. |
| Illegal Instruction Error | If an illegal opcode is detected. | Current packet is discarded. Error response packet is sent. | GIO_L[0] pin will be asserted. Error status bit [0] will also be asserted. Error is reported in the error status register. | Error is reported in the error status register. rx_nmac_cmn_err_pkt_recvd[31:0] is incremented. |
| Channel Number Error | If received packet is Channel #1. Only Channel #0 is supported. | Discard the packet and send error response with channel error bit set. | GIO_L[0] is asserted to indicate packet error. Channel Error status bit is set in Common Status Register (0x8180 bit[10]). The MDIO counter is also updated. | rx_nmac_cmn_err_pkt_recvd[31:0] is incremented. |
| Protocol Error | If received packet is Interlaken as opposed to Interlaken-LA. | Discard the packet and send error response with protocol error set. | GIO_L[0] is asserted to indicate packet error. Protocol Error status bit is set in Common Status Register (0x8180 bit[9]). The MDIO counter is also updated. | rx_nmac_cmn_err_pkt_recvd[31:0] is incremented. |

| Error Name | Error Description | | Action taken by the device | Management Counters and Status Registers |
|---|---|---|---|---|
| | Cause of Error | Functions Affected | | |
| Instruction Burst Error | If the number of data words sent in a PIO or NOP instruction is less or more than the expected number | Current packet is discarded. Error response packet is sent. | GIO_L[0] is asserted to indicate packet error. Error status bit [0] is set. Error is reported in the error status register. | Error is reported in the error status register. rx_nmac_csm_err_pkt_recvd[31:0] is incremented |
| RxNMAC FIFO Parity Error | If a parity error is detected in RxNMAC FIFO memory | Current packet is discarded. Error response packet is sent. | GIO_L[0] is asserted to indicate packet error. Error status bit [0] is set. Error is reported in the error status register. | Error is reported in the error status register. rx_nmac_csm_err_pkt_recvd[31:0] is incremented |
| Burst Control Word Error | If an Interlaken LA Data Word is received without a Burst Control Word | Current packet is discarded. Error response packet is sent. | GIO_L[0] is asserted to indicate packet error. Error status bit [0] is set. Error status bit is set in Common Status Register (0x8180 bit[11]) | Error is reported in the error status register. rx_nmac_csm_err_pkt_recvd[31:0] is incremented |
| Burst Max Error | If received payload size (total number of data word bits) is greater than 640-bits. | Current packet is discarded. Response packet is sent with packet length error set. | GIO_L[0] is asserted to indicate packet error. Burst Max Error status bit is set in Common Status Register (0x8180 bit[4]). The MDIO counter is also updated. | rx_nmac_csm_err_pkt_recvd[31:0] is incremented |
| Missing Data Packet Error | If no data words were received immediately following a Burst Control Word | Current packet is discarded. Error response packet is sent. | GIO_L[0] is asserted to indicate packet error. Error status bit [0] is set. Error is reported in the error status register. | Error is reported in the error status register. rx_nmac_csm_err_pkt_recvd[31:0] is incremented |
| EOP Error | If SOP is received without EOP to previous packet then this error is set. Packet ended with ICW without EOP bit set. This error is flagged only if CRC24 is correct. | Terminate previous packet and send response with EOP error status set | GIO_L[0] is asserted to indicate packet error. EOP Error status bit is set in Common Status Register (0x8180 bit[2]). The MDIO counter is also updated. | rx_nmac_csm_err_pkt_recvd[31:0] is incremented. |
| SOP Error | Data received without burst control word or burst control word is received with no SOP set | The packet is discarded. Response is sent with SOP error status set. | GIO_L[0] is asserted to indicate packet error. SOP Error status bit is set in Common Status Register (0x8180 bit[1]). The MDIO counter is also updated. | rx_nmac_csm_err_pkt_recvd[31:0] is incremented. |

FIG. 10D

| Error Name | Error Description | | Action taken by the device | Management Counters and Status Registers |
|---|---|---|---|---|
| | Cause of Error | Functions Affected | | |
| CRC24 Error | Valid Packet n is received with CRC24 Error | Responses for packet n and n+1 are sent out with CRC Error code if packet n was followed by packet n+1 without any ICW between them. If packet n was terminated with an Idle control word, only response packet n is sent out with CRC error code. Transmission will stop until an error free Control word or Idle word is received. | The device will log the CRC24 error count in management counters accessible to the host through the MDIO interface. GIO_L[1] is asserted to indicate interface error. Also GIO_L[0] is asserted to indicate packet error. | RX_nmac_crc_err_pkt[31:0] Common Status Register |
| | Idle with CRC24 Error | Only flow control is affected. Transmission will stop until an error free Control word or Idle word is received. | | Rx Idle CRC24 Error 0 and 1 |
| Device Errors | | | | |
| Database Soft Error FIFO Overflow | If number of database soft errors detected are more than 16 | Parity scan engine works only during NOPs or IDLEs. No KBP operations are affected. | GIO_L[0] pin will be asserted. Error status bit [1] will also be asserted. Error is reported in the error status register. | Database soft error FIFO registers will contain additional information for this error |
| Database Soft Error FIFO full | If the database soft error FIFO overflows | Parity scan engine works only during NOPs or IDLE cycles. No KBP operations are affected. | GIO_L[1] pin will be asserted. Error status bit [1] will also be asserted. Error is reported in the error status register. | Database soft error FIFO registers will contain additional information for this error |
| Database Soft Error | If a database soft parity error is detected | Parity scan engine works only during NOPs or IDLE cycles. No KBP operations are affected. | GIO_L[1] pin will be asserted. Error status bit [1] will also be asserted. Error is reported in the error status register. | Database soft error FIFO registers will contain additional information for this error |

FIG. 10E

PACKET FORMAT FOR ERROR REPORTING IN A CONTENT ADDRESSABLE MEMORY

TECHNICAL FIELD

The present embodiments generally relate to content addressable memory (CAM) devices, and more particularly to an approach for reporting errors encountered by a CAM device.

BACKGROUND

Content addressable memory (CAM) devices are frequently used in network switching and routing applications to determine forwarding destinations for data packets. A CAM device can be instructed to compare a selected portion of an incoming packet (e.g., a destination address extracted from the packet header) with CAM words (e.g., forwarding address) stored in an array within the CAM device. If there is a matching entry stored in the CAM array, the index of the matching CAM word can be used to access a corresponding location in an associated memory device to retrieve a destination address and/or other routing information for the packet.

A CAM device includes a CAM array having a plurality of CAM cells organized in a number of rows and columns. Each row of CAM cells, which can be used to store a CAM word, is coupled to a corresponding match line that indicates match results for the row. Each column of CAM cells is typically coupled to one or more data lines or data line pairs that can be used to drive data into a selected CAM row during write operations and/or for providing a search key to the CAM rows during compare operations. During a compare operation, the search key (e.g., the comparand word) is provided to the CAM array and compared with the CAM words stored therein. For each CAM word that matches the search key, a corresponding match line is asserted to indicate the match result. If any of the match lines are asserted, a match flag is asserted to indicate the match condition, and a priority encoder determines the match address or index of the highest priority matching entry in the CAM array. The CAM device outputs a response that identifies whether a match was made and if so, the match address or index of the highest priority matching entry in the CAM array.

CAM arrays typically include either binary CAM cells that store binary data values (i.e., a logic "1" or a logic "0" value) or ternary CAM cells that store ternary data values (i.e., a logic "1" value, a logic "0" values, or a don't care value). Ternary CAM cells store a data bit and a mask bit. For example, when a mask bit within a ternary CAM cell is inactive (e.g., set to a logic 1 value), the ternary CAM cell operates as a conventional binary CAM cell storing an "unmasked" data bit. When the mask bit is active (e.g., set to a logic 0 value), the ternary CAM cell is treated as storing a "don't care" value, which means that all compare operations performed on the actively masked ternary CAM cell will result in a cell match condition.

FIG. 1A shows a well-known quaternary CAM cell 100 of the type described in U.S. Pat. No. 5,319,590 issued to Montoye, the disclosure of which is incorporated herein by reference. Quaternary CAM cells, which are also referred to as XY CAM cells, include two storage cells 120 and 122 coupled to a compare circuit 130. The two data bits X and Y can collectively represent four possible states: "0", "1", "don't care", and a fourth state which may be left unused or may indicate "invalid," as depicted in FIG. 1B. The logic "0" and "1" states correspond to the logic states represented, for example, by a conventional binary CAM cell. For each of these states, if the comparand data (e.g., provided to CAM cell 100 via complementary comparand lines CL and CLB) matches the data stored in CAM cell 100, compare circuit 130 does not discharge the match line ML, which indicates a match condition. Conversely, if the comparand data does not match the data stored in CAM cell 100, compare circuit 130 discharges ML (e.g., toward ground potential) to indicate the mismatch condition. For the "don't care" state, the logic low values for X and Y maintain respective transistors 132 and 134 in non-conductive states, thereby preventing compare circuit 130 from discharging ML. In this manner, data stored in CAM cell 100 is masked from the compare operation, thereby forcing a match condition for CAM cell 100, regardless of the comparand data. For the "invalid" state, the logic high values for X and Y maintain respective transistors 132 and 134 in conductive states. During a compare operation, one of the complementary comparand data bit pair provided on CL/CLB will be logic high, thereby causing compare circuit 130 to discharge ML to indicate the mismatch state. In this manner, data stored in CAM cell 100 forces a mismatch condition, regardless of the comparand data, and is therefore not normally used.

The format of a data packet may conform to a standard protocol, such as Interlaken. Interlaken is an interconnect protocol which may be used by certain CAM devices. Interlaken is optimized for high-bandwidth and reliable packet transfers. The Interlaken protocol builds on the channelization and per channel flow control features of the SPI-4.2 protocol, while reducing the number of chip I/O pins. In the Interlaken protocol, bundles of serial links create a logical connection between components with multiple channels, backpressure capability, and data-integrity protection to boost the performance of communications equipment.

The Interlaken protocol is silent with respect to how error conditions experienced by a CAM device may be reported. U.S. Pat. No. 6,690,595 (the '595 patent), incorporated herein by reference, is illustrative of a prior art technique for reporting that a CAM device is encountering an error condition. The '595 patent teaches an approach where a CAM device includes a CAM array and an error detection circuit coupled to receive a data value from a selected storage location within the CAM array. The error detection circuit is adapted to generate an error indication according to whether the data value includes an error. An error storage circuit is coupled to receive the error indication from the error detection circuit and is adapted to store an error address that corresponds to the selected storage location if the error indication indicates that the data value includes an error and if the error address is not already stored within the error storage circuit.

BRIEF DESCRIPTION OF THE DRAWINGS

Present embodiments are illustrated by way of example, and not by way of limitation, in the figures of the accompanying drawings and in which like reference numerals refer to similar elements and in which:

FIG. 4 is an illustration of a control and data word format according to an illustrative embodiment;

FIGS. 5A-5C depict additional details about the control word format which may be employed by request packets and response packets according to certain embodiments;

FIG. 6 depicts additional details about the data word format which may be employed by request packets and response packets according to certain embodiments;

FIG. 7 is a table that describes how each error category may be represented in the status field, the CAM device's behavior under each type of category of error, and a suggested corrective action from the host according to certain embodiments;

FIG. 8 is an illustration of an exemplary packet error response format according to certain embodiments;

FIGS. 9A-9B illustrate the format for reporting packet errors according to certain embodiments; and FIGS. 10A-10E depict a table providing details about how a CAM device may respond to various error conditions according to certain embodiments.

DETAILED DESCRIPTION

Approaches for a packet format for error reporting in a CAM device are disclosed. A CAM device may be incorporated as part of a host device, such as a router or switch. The host device may provide the CAM device a request packet to process. The request packet will contain data, such as a control word or data word. As a result of the processing performed on the request packet by the CAM device, the CAM device generates a response packet, which may be subsequently delivered to the host device for further processing and/or forwarding to the packet's final destination or next hop.

In certain embodiments, the response packet generated by the CAM device indicates whether the CAM device experienced an error condition. If an error condition was experienced by the CAM device, the response packet may also indicate the type of error that was encountered. Advantageously, information about any error condition experienced by the CAM device may be quickly ascertained by the host device.

Figures 1A, 1B:
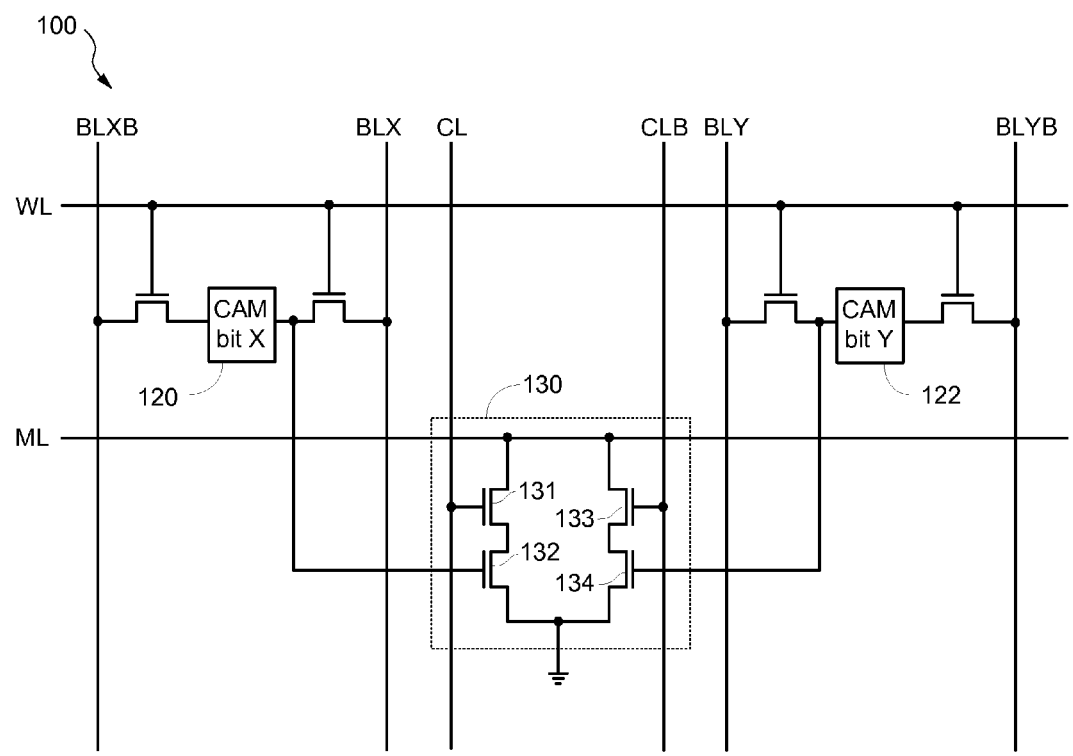
FIG. 1A is circuit diagram of a conventional quaternary (XY) CAM cell.
FIG. 1B shows a truth table for conventional data storage of the XY CAM cell of FIG. 1A.
Figure 2A:
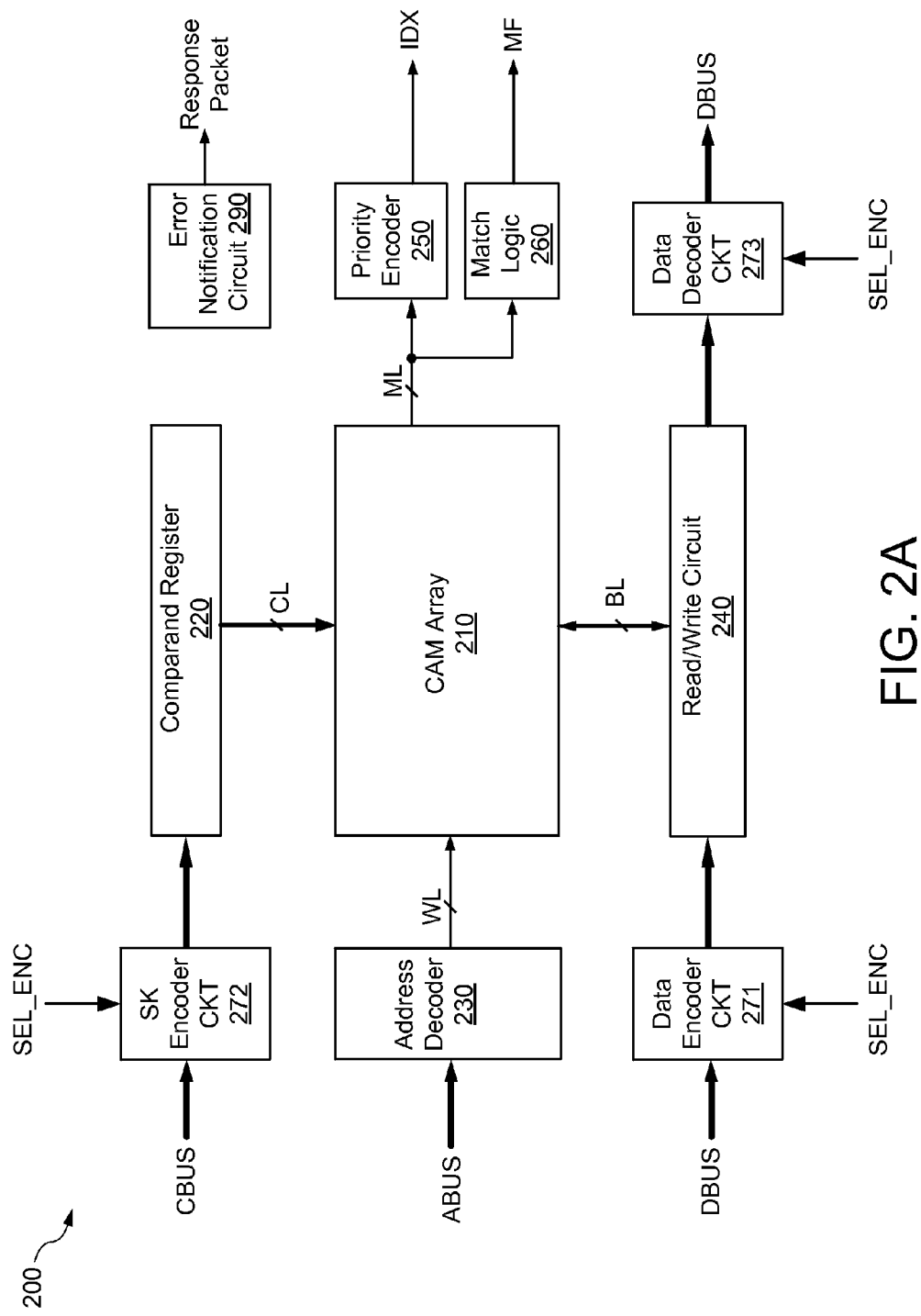
FIG. 2A is a block diagram of a CAM device according to one embodiment.

FIG. 2A is a block diagram of a CAM device 200 in accordance with present embodiments. CAM device 200 includes a CAM array 210, a comparand register 220, an address decoder 230, a read/write circuit 240, a priority encoder circuit 250, match logic 260, a data encoder circuit 271, a search key encoder circuit 272, a data decoder circuit 273, and error notification circuit 290. CAM array 210 includes any number of rows of CAM cells (not shown in FIG. 2A), which for exemplary embodiments described herein are XY CAM cells of the type shown in FIG. 1A. For other embodiments, CAM array 210 can also include other types of CAM cells such as binary or ternary CAM cells. While CAM array 210 is shown in FIG. 2A as a single CAM array, it can include any number of CAM array blocks that can be independently searched.

One or more instructions and related control signals may be provided to CAM device 200 from an instruction decoder (not shown for simplicity) to control read, write, compare, and other operations for CAM device 200. Other well-known signals which can be provided to CAM device 200, such as enable signals, clock signals, and power connections, are also not shown for simplicity. Further, although not shown in FIG. 2A, each row of CAM cells in CAM array 210 can have one or more validity bits to indicate whether the corresponding row (or any segment thereof) of CAM cells stores valid data. In addition, for some embodiments, the rows in CAM array 210 can be divided into a plurality of row segments, for example, to reduce the capacitive loading for each row or to provide multiple width/depth configurations for the array.

Each row of CAM cells (not shown for simplicity) in CAM array 210 is coupled to well-known address decoder 230 via a corresponding word line WL, and to a well-known priority encoder 250 and to well-known match logic 260 via a corresponding match line ML. For simplicity, the word lines and match lines are represented collectively in FIG. 2A. The match lines ML provide match results for compare operations between comparand data (e.g., a search word or search key) and data stored in CAM array 210 to priority encoder 250. In response thereto, priority encoder 250 determines the matching entry that has the highest priority number associated with it and generates the index (IDX) or address of this highest priority match (HPM). In addition, priority encoder 250 may use the validity bits from CAM array 210 to generate the next free address (NFA) that is available in CAM array 210 for storing new data. Although not shown in FIG. 2A, for some embodiments, priority encoder 250 may provide the NFA to address decoder 230.

Each column of CAM cells (not shown for simplicity) in CAM array 210 is coupled to comparand register 220 via one or more corresponding comparand lines CL, and is coupled to read/write circuit 240 via one or more corresponding bit lines BL. For simplicity, the comparand lines CL and bit lines BL are represented collectively in FIG. 2A. Comparand register 220 is well-known, and is configured to provide a search key (e.g., a comparand word) received from a comparand bus CBUS to CAM array 210 during compare operations with data stored therein. For other embodiments, the search key can be provided to CAM array 210 via another bus and/or circuit. Read/write circuit 240 includes write drivers to write data received from a data bus DBUS to CAM array 210, and includes sense amplifiers to read data from CAM array 210 onto DBUS. For other embodiments, read/write circuit 210 may be coupled to a bus other than DBUS. Further, although not shown in FIG. 2A for simplicity, CAM device 200 can include a well-known global mask circuit (e.g., coupled to the comparand register 220) that can selectively mask the bits of the search key provided to the CAM array 210.

Data encoder circuit 271 includes an input coupled to DBUS, an output coupled to read/write circuit 240, and a control terminal to receive a select encoding signal (SEL_ENC). In response to SEL_ENC, data encoder circuit 271 selectively encodes a data word received from DBUS using a selected one of a number of different encoding schemes to create an encoded data word to be written into CAM array 210 by read/write circuit 240. Search key encoder circuit 272 includes an input coupled to CBUS, an output coupled to comparand register 220, and a control terminal to receive SEL_ENC. In response to SEL_ENC, search key encoder circuit 272 selectively encodes a search key received from CBUS using the selected encoding scheme to create an encoded search key to be provided to CAM array 210 by comparand register 220 for search operations with encoded data words stored in CAM array 210. In this manner, the search key and data words stored in CAM array 210 are encoded using the same selected encoding scheme. For other embodiments, data encoder circuit 271 and search key encoder circuit 272 can be the same circuit.

Data decoder circuit 273 includes an input coupled to read/write circuit 240, an output coupled to DBUS, and a control terminal to receive SEL_ENC. In response to SEL_ENC, data decoder circuit 273 selectively decodes an encoded data word read from CAM array 210 by read/write circuit 240. In this manner, data decoder circuit 273 converts encoded data stored in CAM array 210 back into the format (e.g., binary values) in which they were originally received by CAM device 200.

Error notification circuit 290 may be electronically coupled to a variety of components within a CAM device. Error notification circuit 290 may be implemented by any component capable of forming a packet (referred to herein as a response packet) that indicates whether the CAM device is experiencing an error condition. As embodiments may employ different approaches for detecting an error condition, the components to which error notification circuit 290 is electronically coupled may vary from implementation to implementation, and thus for simplicity such connections are not depicted in FIG. 2A.

Figure 2B:
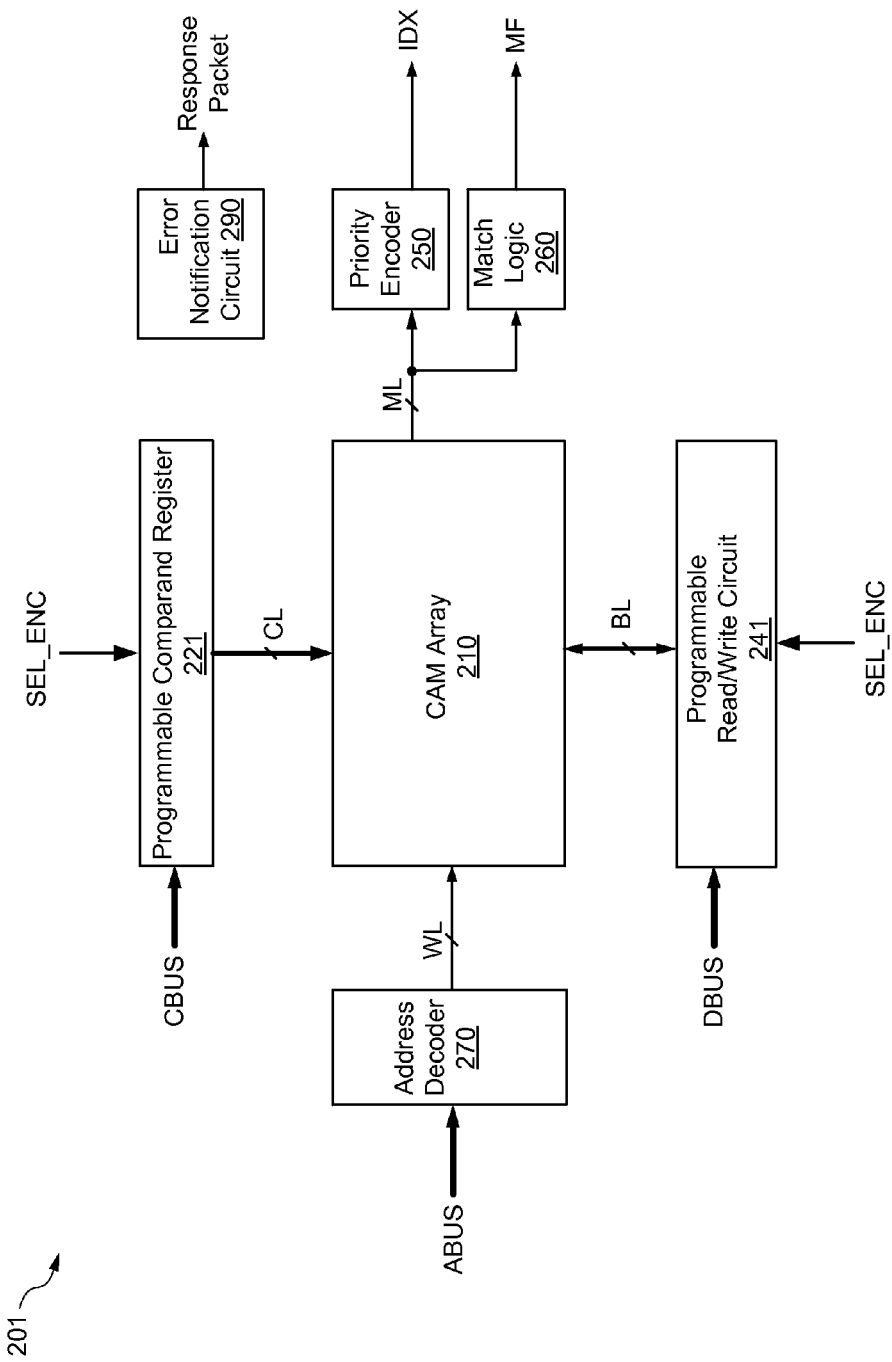
FIG. 2B is a block diagram of a CAM device according to one embodiment.

FIG. 2B is a block diagram of a CAM device 201 in accordance with other embodiments. CAM device 201 is similar to CAM device 200 of FIG. 2A, except that CAM device 201 includes a programmable read/write circuit 241 and a programmable comparand register 221, wherein programmable read/write circuit 241 performs the functions of read/write circuit 240, data encoder circuit 271, data decoder circuit 273, and error notification circuit 290. Programmable comparand register 221 performs the functions of comparand register 220 and search key encoder circuit 272.

Figure 3:
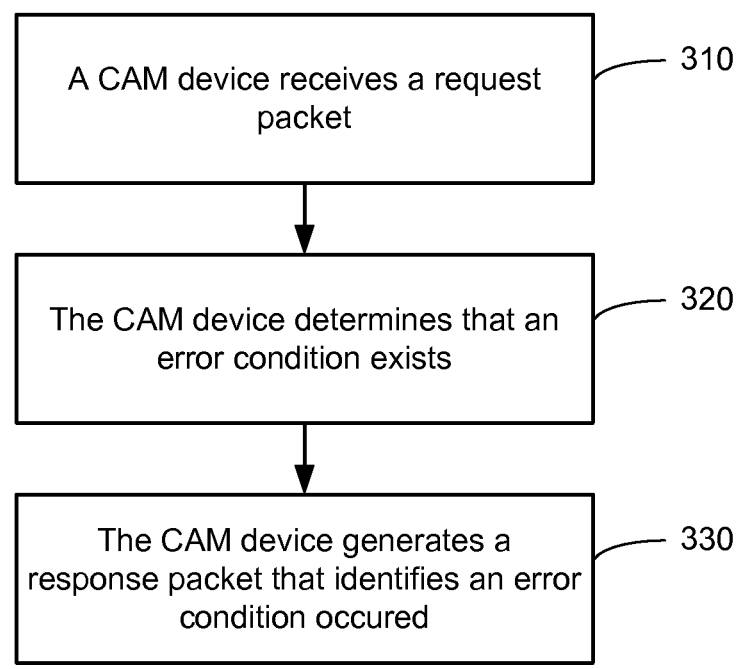
FIG. 3 is a flowchart illustrating steps performed by a CAM array in reporting an error condition according to certain embodiments.

FIG. 3 is a flowchart illustrating high-level steps performed by a CAM device in reporting an error condition according to certain embodiments. First, a CAM device (such as CAM device 200 or 201) receives a request packet (310). The CAM device may receive the request packet from a host device, such as a router or switch, in which the CAM device is incorporated. The request packet includes data to be compared with CAM words stored in an array within the CAM device.

Next, the CAM device determines than an error condition exists (320). Embodiments may employ a variety of different techniques to determine that an error condition exists. Consequently, embodiments are not limited to any particular method or technique for determining that an error condition has been encountered by the CAM device. Non-limiting, illustrative examples of techniques for determining that an error condition exists which may be employed by certain embodiments are discussed in the following patents, each of which is incorporated by reference: (a) U.S. Pat. No. 7,237,156, (b) U.S. Pat. No. 6,597,595, (c) U.S. Pat. No. 6,978,343, (d) U.S. Pat. No. 6,690,595, and (e) U.S. Pat. No. 7,257,763.

Thereafter, after determining that an error condition exists, the CAM device generates a response packet that identifies that an error condition occurred (330). In one approach, an error notification circuit may form the response packet as depicted in the drawings and discussed herein. The error notification circuit may be implemented using any technique for forming a packet according to the features discussed and depicted herein. The CAM device may deliver the response packet to the host device.

In an embodiment, request packets and response packets conform to the Interlaken (I-LA) specification. In a packet, control words are transmitted first, followed by one or more data words. The contents of each control word and data word is transmitted in the order of bit-66 down to bit-0.

FIG. 4 is an illustration of a control and data word format for both a request packet and a response packet according to an illustrative embodiment. In the example shown in FIG. 4, a packet contains one control word followed by three data words (data words 0-2). Bit-66 of each control word and data word corresponds to an inversion value, which is used to indicate whether bits 63:0 have been inverted to limit the running disparity. Bits 65-64 of each control word and data word are framing bits, which is a mechanism to distinguish control words and data words. Bits 63-0 of each control word and data word correspond to the actual control word or valid data. In certain embodiments, error notification circuit 290 may form a response packet that conforms to the format depicted in FIG. 4.

FIGS. 5A-5C depict additional details about the control word format which may be employed by request packets and response packets according to certain embodiments. In particular, FIG. 5B illustrates that bits 31:30 of a response packet correspond to an error status value. Bits 31:30 may be used to identify whether an error condition has been encountered by the CAM device. In other embodiments (not depicted in FIGS. 5A-5C), other bit(s) may be used to identify whether an error condition has been encountered by the CAM device; thus, embodiments are not limited to communicating the detection of an error condition in bits 31:30 of a response packet. In certain embodiments, error notification circuit 290 may form a response packet that conforms to the format depicted in FIGS. 5A-5C.

FIG. 6 depicts additional details about the data word format which may be employed by request packets and response packets according to certain embodiments. As illustrated in the example of FIG. 6, valid data associate with each instruction may be communicated in bits 63:0 of a request or response packet.

A variety of different types of errors may be identified in response packets according to embodiments of the invention. For example, certain embodiments may identify, within response packets, packet errors, interface errors, and/or device errors. A packet error is an error that only affects a single packet. An example of a packet error is an illegal instruction that is detected as a result of an invalid opcode. An interface error is an error that affects the CAM device's ability to properly receive packets. An example of an interface error is a "Word Boundary Sync Error" which occurs when 16 consecutive invalid Interlaken-LA sync bits are detected. A device error is an error that affects the integrity of the stored data. An example of a device error is a database parity error. Such errors are reported via the status field, which is part of the response packet control word.

FIG. 7 is a table that describes how each error category may be represented in the error status field (bits 31:30) and the CAM device's behavior under each type of category of error according to an example. In the embodiment depicted in FIG. 7, a single bit of the error status field (bit 31) is used to indicate the presence of either a device error or an interface error. A device error and an interface error may be distinguished by reviewing data stored in the status registers. Also shown in FIG. 7, a single bit of the error status field (bit 30) is used to indicate the presence of a packet error.

When a packet error is detected, the CAM device may generate a response packet that conforms to the format depicted in FIG. 8. In certain embodiments, the response packet may be formed by error notification circuit 290. The packet error code field in data word 0 contains information used in identifying the particular error condition experienced by the CAM device. Interface errors and device errors will be reported only in the error status field (bits [31:30]) of the response control word; therefore, no data words will be modified in reporting interface errors and device errors.

FIGS. 9A-9B illustrate the format for a packet error code field according to certain embodiments. As shown in FIG. 9A, the values of particular bits may be used to indicate whether certain types of errors have been detected. For example, the value of bit 41 of data word 0 may be used to specify whether the maximum number of active blocks per search has been exceeded. As another example, the value of bit 39 of data word 0 may be used to specify whether a context buffer parity error has been detected, the value of bit 38 of data word 0 may be used to specify whether a LTR parity error has been detected, and the value of bit 37 of data word 0 may be used to specify whether a device ID mismatch error has been detected. As another example, the value of bit 36 of data word 0 may be used to specify whether a illegal instruction error has been detected, the value of bit 16 of data word 0 may be used to specify whether a parity error has been detected in the RxPCS EFIFO and the value of bit 15 of data word 0 may be used to specify whether an Interlaken data word has been received with a burst control word. The RxPCS EFIFO is a small memory file which stores incoming data for a short time. While writing data to memory, parity is calculated across a certain number of bits. When reading from memory, parity is once again generated on the data. If the parity calculated upon reading the data does not match the parity calculated upon writing the data, then it is possible one or more bits in the data are corrupted and cannot be properly processed. FIGS. 9A and 9B depict additional examples of how values of particular bits may be used to indicate whether other types of errors have been detected.

Figure 10B:

Table 1000 depicted in FIGS. 10A-10E describes exemplary error types, exemplary causes of errors, exemplary affected functionality, exemplary responsive actions taken by the CAM device, and exemplary management and status registers that may be updated when an error occurs. The errors listed in each row of table 1000 correspond to errors which may be identified by setting particular bits in a data word as depicted in FIGS. 9A-9B. In certain embodiments, error notification circuit 290 may form a response packet that conforms to the format depicted in FIGS. 9A-9B and/or 10A-10E. For example, FIG. 10E depicts an error named "CRC24," which may be the result of noise. Embodiments of the invention enable this error to be identified and overcome in real time, thereby preventing packets from becoming systematically corrupted.

While particular embodiments have been shown and described, it will be obvious to those skilled in the art that changes and modifications may be made without departing from this disclosure in its broader aspects and, therefore, the appended claims are to encompass within their scope all such changes and modifications as fall within the true spirit and scope of this disclosure.

Further, it should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media).

What is claimed is:

1. A content addressable memory (CAM) device, comprising:
    a CAM array including a CAM cell coupled to a match line; and
    an error notification circuit configured to form a packet, the packet being configured to indicate whether the CAM device experienced an interface error or a device error without modifying a data word in the packet.

2. The CAM device of claim 1, wherein values of at least two bits in the packet are configured to indicate whether the CAM device experienced the interface error or the device error.

3. The CAM device of claim 1, wherein the packet is further configured to identify whether the CAM device experienced a packet error.

4. The CAM device of claim 1, wherein the packet is configured to conform to the Interlaken protocol.

5. The CAM device of claim 1, wherein the packet is further configured to indicate that the CAM device experienced a packet error, and wherein the data word is configured to include information about the packet error.

6. A network device, comprising:
    a content addressable memory (CAM) device, wherein the CAM device includes a CAM cell coupled to a match line; and
    an error notification circuit configured to form a packet, the packet being configured to indicate whether the CAM device experienced an interface error or a device error without modifying a data word in the packet.

7. The network device of claim 6, wherein values of at least two bits in the packet are configured to indicate whether the CAM device experienced the interface error or the device error.

8. The network device of claim 6, wherein the packet is further configured to identify whether the CAM device experienced a packet error.

9. The network device of claim 6, wherein the packet is configured to conform to the Interlaken protocol.

10. The network device of claim 6, wherein the packet is further configured to indicate that the CAM device experienced a packet error, and wherein the data word is configured to include information about the packet error.

11. A method for processing a packet, comprising:
    receiving a first packet in a content addressable memory (CAM) device; and
    forming a second packet in the CAM device that indicates whether the CAM device experienced an interface error or a device error in processing the first packet without modifying a data word in the second packet.

12. The method of claim 11, wherein values of two bits in the second packet indicate whether the CAM device experienced the interface error or the device error.

13. The method of claim 11, wherein the second packet further identifies whether the CAM device experienced a packet error.

14. The method of claim 11, wherein the second packet conforms to the Interlaken protocol.

15. The method of claim 11, wherein the second packet further indicates that the CAM device experienced a packet error, and wherein the data word includes information about the packet error.

* * * * *